(12) United States Patent
Foong et al.

(10) Patent No.: US 9,569,141 B2
(45) Date of Patent: Feb. 14, 2017

(54) HASH MAP SUPPORT IN A STORAGE DEVICE

(71) Applicant: Intel Corporation, Santa Clara, CA (US)

(72) Inventors: Annie Foong, Aloha, OR (US); Bryan E. Veal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 33 days.

(21) Appl. No.: 14/228,822

(22) Filed: Mar. 28, 2014

(65) Prior Publication Data
US 2015/0278208 A1 Oct. 1, 2015

(51) Int. Cl.
*G06F 17/30* (2006.01)
*G06F 3/06* (2006.01)

(52) U.S. Cl.
CPC .......... *G06F 3/0679* (2013.01); *G06F 3/0638* (2013.01)

(58) Field of Classification Search
CPC .......................... G06F 17/3097; G06F 3/0678
See application file for complete search history.

(56) References Cited

U.S. PATENT DOCUMENTS

| 2011/0276744 | A1* | 11/2011 | Sengupta | ............ | G06F 12/0866 711/103 |
| 2014/0325115 | A1* | 10/2014 | Ramsundar | ......... | G06F 12/0238 711/102 |
| 2015/0193156 | A1* | 7/2015 | Patel | ................... | G06F 11/1471 711/103 |

\* cited by examiner

*Primary Examiner* — Apu Mofiz
*Assistant Examiner* — Cindy Nguyen
(74) *Attorney, Agent, or Firm* — Chapin Intellectual Property Law, LLC

(57) ABSTRACT

In an embodiment, a storage device may include device processing logic. The device processing logic may acquire a command associated with a key-value pair (KVP). The command may be, for example, a get, set, or delete command. The KVP may include a hash value and an item. The hash value may be a key in the KVP and the item may be a value in the KVP. The device processing logic may translate the acquired command into one or more block-oriented commands which may be executed by the device processing logic to perform various operations on the storage device.

14 Claims, 13 Drawing Sheets

HASH MAP SUPPORT IN A STORAGE DEVICE

BACKGROUND

Many existing key-value caches, key-value stores, and NoSQL databases use solid-state disks (SSDs) as storage. To overcome the SSD's performance problems with small random writes, these applications typically employ a hash map with an indirection mechanism such as log structured storage which coalesces writes into sequential blocks. Due to periodic compaction of free space, such mechanisms may incur processor and host memory overheads and poor storage capacity utilization

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
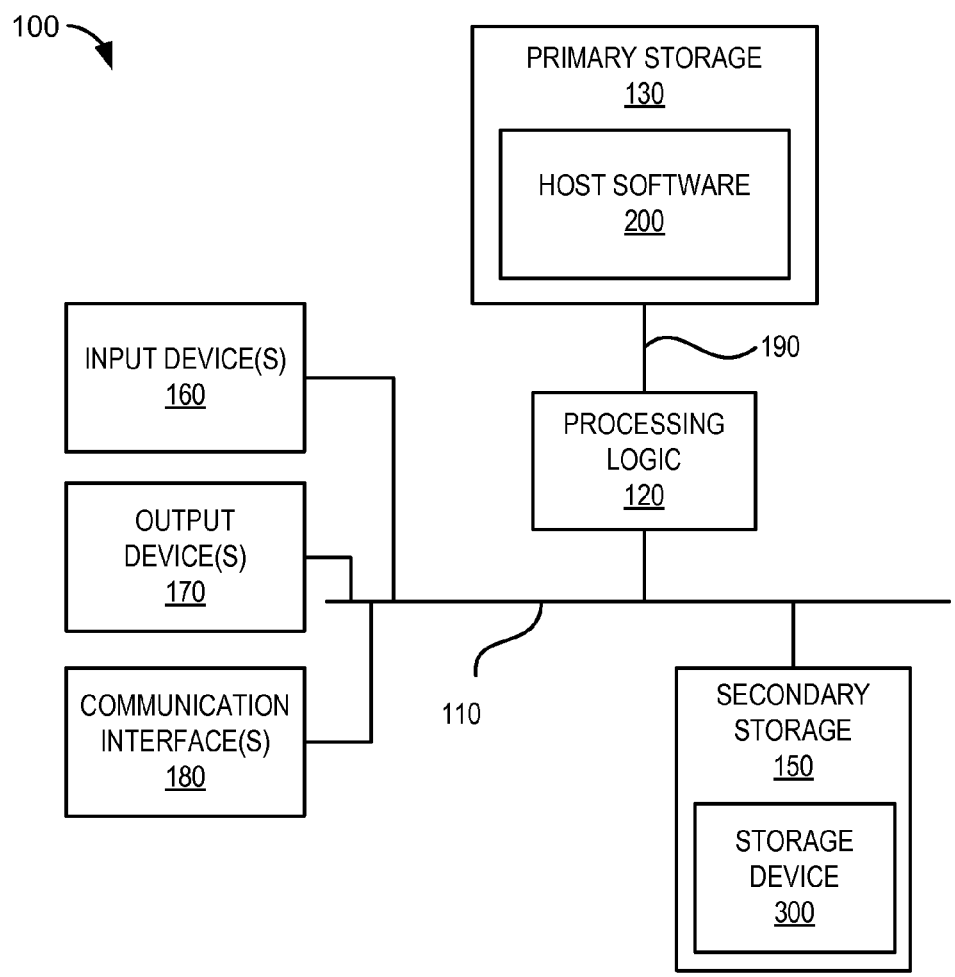
FIG. 1 illustrates a block diagram of an example embodiment of a computing device.

The following detailed description refers to the accompanying drawings. The same reference numbers in different drawings may identify the same or similar elements. Also, the following detailed description does not limit the invention.

A computing device may include, for example, processing logic and storage. The processing logic may include logic (e.g., hardware) for executing and/or manipulating information that may be stored in the storage. The information may include, for example, data and/or computer-executable instructions.

The storage may include one or more memory devices for storing the information. The storage may be volatile and/or non-volatile. A storage that is volatile may lose information stored in the storage when power is removed from the storage. A storage that is non-volatile may retain information in the storage when power is removed from the storage. A storage that is volatile may be referred to as a volatile storage and a storage that is non-volatile may be referred to as a non-volatile storage.

For example, a computing device may contain a processor and storage. The storage may include one or more memory devices that may be used to store information. The information may include, for example, data that may be manipulated by the processor and/or computer-executable instructions that may be executed by the processor.

The memory devices may provide a volatile and/or non-volatile storage for the computing device. Information that is to persist after power is removed from the computing device may be stored in memory devices that may provide a non-volatile storage for the computing device. Information stored in memory devices that provide a volatile storage for the computing device may be lost after power is removed from the computing device.

Techniques described herein may be employed by a storage device such as, for example, a solid-state disk (SSD). The storage device may contain non-volatile random access memory devices that may provide low-latency random access to information stored by the memory devices.

Techniques described herein may be incorporated into efficient logic on the storage device. The logic may be included in, for example, in an application specific integrated circuit (ASIC) contained in the storage device.

Techniques described herein may be used to offload basic hash map operations from software which may be executed by a host that may be connected to the storage device. For example, techniques described herein may be used by the storage device to directly service hash map get, set, and/or delete commands from the host. This may, for example, improve throughput, response times, host processor and memory overheads, and/or storage capacity utilization. Instead of providing full storage device-based implementations of key-value store, object store, or sparse addressing, the storage device may incorporate techniques described herein to provide primitive hash table operations which may simplify implementation on the storage device and provide flexibility to implement more complex models in software that may, for example, execute on the host.

One or more techniques described herein may be implemented in a computing device. Examples of computing devices that may implement one or more techniques described herein may include smart phones, tablets, laptop computers, desktop computers, servers, embedded systems, and ultrabooks.

FIG. 1 illustrates an example embodiment of a computing device 100 that may implement one or more techniques described herein. Referring to FIG. 1, computing device 100 may include various components such as, for example, primary storage 130, processing logic 120, secondary storage 150, one or more input devices 160, one or more output devices 170, one or more communication interfaces 180, memory bus 190, and input/output (I/O) bus 110.

It should be noted that FIG. 1 illustrates an example embodiment of a computing device and that other computing devices that may implement one or more techniques described herein may include more components or fewer components than the components illustrated in FIG. 1. Further, the components may be arranged differently than as illustrated in FIG. 1.

For example, a computing device that may implement one or more techniques described herein may have a portion of secondary storage 150 contained at a remote site that provides "cloud" storage. The site may be accessible to the computing device via a communications network such as, for example, the Internet. A communication interface 180 may be used to interface the computing device with the communications network.

Also, it should be noted that functions performed by various components contained in other of computing devices that may implement one or more techniques described herein may be distributed among the components differently than as described herein.

I/O bus 110 may be a bus that may enable communication among components in computing device 100 such as, for example, processing logic 120, secondary storage 150, one or more input devices 160, one or more output devices 170, and one or more communication interfaces 180. The communication may include, among other things, transferring, for example, data and/or control signals between the components. Examples of busses that may be used to implement I/O bus 110 may include the serial AT attachment (SATA) bus, peripheral component interconnect (PCI) bus, PCI express (PCI-e) bus, universal serial bus (USB), small computer system interface (SCSI) bus, and the serial attached SCSI (SAS) bus.

Processing logic 120 may include logic for interpreting, executing, and/or otherwise processing information (e.g., data, computer-executable instructions). The information may include information that may be stored in, for example, primary storage 130 and/or secondary storage 150. In addition, the information may include information that may be acquired by one or more input devices 160 and/or communication interfaces 180.

Processing logic 120 may include a variety of heterogeneous hardware. The hardware may include, for example, some combination of one or more processors, microprocessors, field programmable gate arrays (FPGAs), application specific instruction set processors (ASICs), application specific integrated circuits (ASICs), complex programmable logic devices (CPLDs), graphics processing units (GPUs), and/or other types of processing logic that may, for example, interpret, execute, manipulate, and/or otherwise process information. Processing logic 120 may comprise a single core or multiple cores. Examples of processors that may be used to implement processing logic 120 may include the Intel® Xeon® processor and Intel® Atom™ brand processors which are available from Intel Corporation, Santa Clara, Calif.

Input devices 160 may include one or more devices that may be used to input information into computing device 100. These devices may include, for example, a keyboard, computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, puck, eyeball controlled device, finger mouse, light pen, light gun, neural device, eye tracking device, steering wheel, yoke, jog dial, space ball, directional pad, dance pad, soap mouse, haptic device, tactile device, neural device, multi-point input device, discrete pointing device, or some other input device.

The information may include, for example, spatial (e.g., continuous, multi-dimensional) data that may be input into computing device 100 using, for example, a pointing device, such as a computer mouse. The information may also include other forms of data, such as, for example, text that may be input using a keyboard.

Output devices 170 may include one or more devices that may output information from computing device 100. These devices may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, volumetric display device, plotter, touch screen, or some other output device.

Output devices 170 may be directed by, for example, processing logic 120, to output the information from computing device 100. Outputting the information may include presenting (e.g., displaying, printing) the information on an output device 170. The information may include, for example, text, graphical user interface (GUI) elements (e.g., windows, widgets, and/or other GUI elements), audio (e.g., music, sounds), and/or other information that may be outputted by output devices 170.

Communication interfaces 180 may include logic for interfacing computing device 100 with, for example, one or more communications networks and enable computing device 100 to communicate with one or more entities (e.g., nodes) coupled to the communications networks. The communications networks may include, for example, the Internet, wide-area networks (WANs), local area networks (LANs), 3G and/or 4G networks.

Communication interfaces 180 may include one or more transceiver-like mechanisms that may enable computing device 100 to communicate with entities coupled to the communications networks. Examples of communication interfaces 180 may include a built-in network adapter, network interface card (NIC), Personal Computer Memory Card International Association (PCMCIA) network card, card bus network adapter, wireless network adapter, Universal Serial Bus (USB) network adapter, modem, and/or other device that may be suitable for interfacing computing device 100 to a communications network.

Primary storage 130 and secondary storage 150 may include one or memory devices that may be used to store information for computing device 100. A memory device may support, for example, serial or random access to information stored in the memory device. A memory device that supports serial access to information stored in the memory device may be referred to as a serial memory device. A memory device that supports random access to information stored in the memory device may be referred to as a random access memory (RAM) device.

A memory device may be, for example, a volatile memory device or a non-volatile memory device. A volatile memory device may be a memory device that may lose information stored in the device after power is removed from the memory device. A non-volatile memory device may be a memory device that may retain information stored in the memory device after power is removed from the memory device.

Examples of memory devices that may be used in computing device 100 may include dynamic RAM (DRAM) devices, flash memory devices, static RAM (SRAM) devices, zero-capacitor RAM (ZRAM) devices, twin transistor RAM (TTRAM) devices, read-only memory (ROM) devices, ferroelectric transistor RAM (FeTRAM) devices, magneto-resistive RAM (MRAM) devices, phase change memory (PCM) devices, three-dimensional cross-point memory devices, nanowire-based devices, resistive RAM memory (RRAM) devices, and electrically erasable programmable ROM (EEPROM) devices.

Memory bus 190 may enable information, which may be stored in primary storage 130, to be transferred between processing logic 120 and primary storage 130. The information may include, for example, computer-executable instructions and/or data that may be executed, manipulated, and/or otherwise processed by processing logic 120.

Primary storage 130 may include host software 200. Host software 200 may include, for example, computer-executable instructions and/or data that when executed by processing logic 120 may perform various functions. These functions may include implementing one or more techniques described herein. Details of host software 200 will be described further below.

Secondary storage 150 may provide a secondary storage for information that may be used by computing device 100. The information may include data that may be manipulated by processing logic 120. The information may also include computer-executable instructions that may be, for example, transferred to primary storage 130 prior to being executed by processing logic 120.

Secondary storage 150 may include a storage device 300 that may be used to store the information. The storage device 300 may be accessible to processing logic 120 via I/O bus 110. Details of storage device 300 will be discussed further below.

Figure 2:
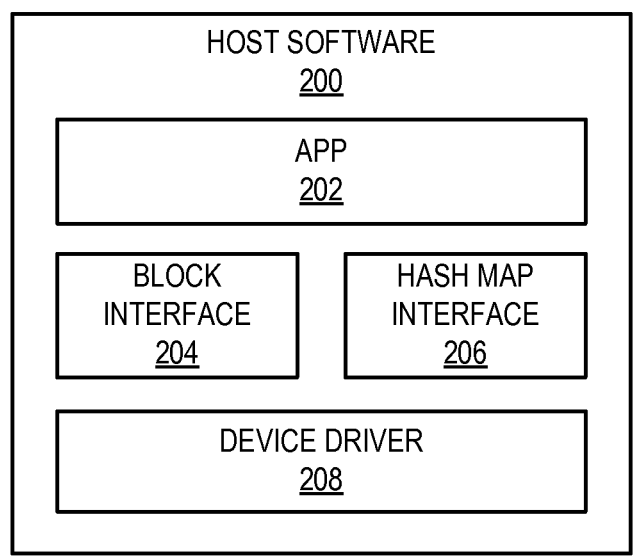
FIG. 2 illustrates an example embodiment of host software that may executed by a computing device.

FIG. 2 illustrates an example embodiment of host software 200. Referring to FIG. 2, host software 200 may include various components such as, for example, an application (APP) 202, a block interface 204, a hash map interface 206, and a device driver 208. It should be noted that FIG. 2 illustrates an example embodiment of host software 200 and that other embodiments of host software 200 may include more components or fewer components than the components illustrated in FIG. 2. Further, functions performed by various components contained in other embodiments of host software 200 may be distributed among the components differently than as described herein.

APP 202 may be a software application that may execute on computing device 100. APP 202 may include one or more computer-executable instructions that may be executed by processing logic 120. The instructions may implement one or more functions that may, for example, generate one or more requests associated with getting, setting, and/or deleting information on storage device 300. The requests may include block-oriented requests and/or key-value pair (KVP) oriented requests.

Block interface 204 may include one or more computer-executable instructions that may be executed by processing logic 120. The instructions when executed may perform one or more acts that may be associated with, for example, processing block-oriented requests that may be generated by APP 202. The block-oriented requests may include requests to read, write, and/or delete logical blocks of information that may be stored on storage device 300.

Hash map interface 206 may include one or more computer-executable instructions that may be executed by processing logic 120. The instructions when executed may perform one or more acts that may be associated with, for example, processing KVP-oriented requests that may be generated by APP 202. The KVP-oriented requests may include requests to read, write, and/or delete, for example, KVP information that may be stored by storage device 300. As will be described further below, KVP information may include information that pairs a key with a value (e.g., data). The key may be used to, for example, identify the value.

Device driver 208 may include computer-executable instructions that may be executed by processing logic 120. The instructions when executed may perform one or more acts that may be associated with interfacing the block interface 204 and the hash map interface 206 with storage device 300.

For example, block interface 204 and hash map interface 206 may generate various requests based on requests made by APP 202. The requests generated by block interface 204 and hash map interface 206 may be translated by device driver 208 into one or more commands that may be issued to storage device 300. The commands may include, for example, block-oriented commands and/or KVP-oriented commands.

Block-oriented commands may include commands that may be used to direct storage device 300 to read, write, and/or delete information associated with logical blocks contained in storage device 300. KVP-oriented commands may include commands that may be used to direct storage device 300 to read, write, and/or delete KVP-oriented information. KVP-oriented information may include, for example, information that may be associated with a key. As will be described further below, the information may be an item and the key may be a hash value. As will also be described further below, the KVP-oriented commands may be translated into, for example, one or more block-oriented commands by storage device 300. The block-oriented commands may be performed (e.g., executed) by processing logic contained in the storage device 300 to read, write, and/or delete the KVP-oriented information in the storage device 300.

Figure 3:
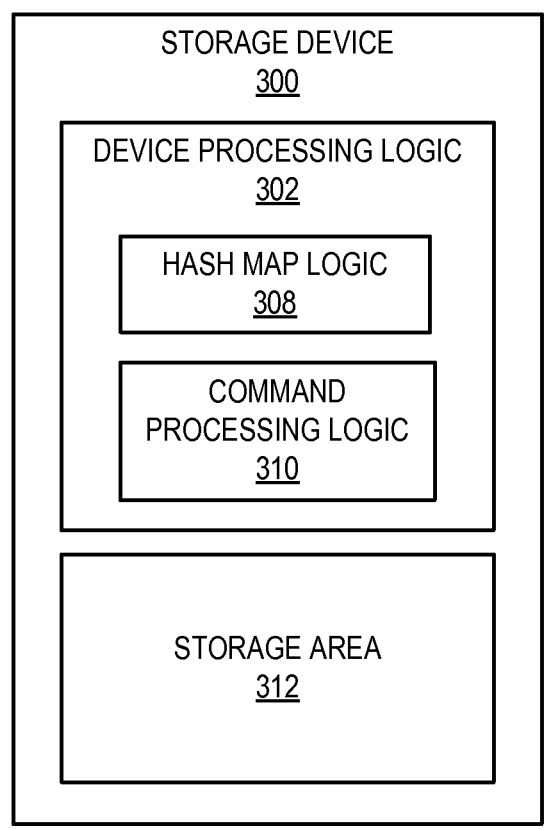
FIG. 3 illustrates an example embodiment of a storage device that may be associated with a computing device.

FIG. 3 illustrates an example embodiment of storage device 300. Referring to FIG. 3, storage device 300 may include various components such as, for example, device processing logic and storage area 312. It should be noted that FIG. 3 illustrates an example embodiment of storage device 300 and that other embodiments of storage device 300 may include more components or fewer components than the components illustrated in FIG. 3. Further, functions performed by various components contained in other embodiments of storage device 300 may be distributed among the components differently than as described herein.

The device processing logic 302 may include, for example, hash map logic 308, and command processing logic 310. Hash map logic 308 may include logic for processing KVP-oriented commands. Processing the KVP-oriented commands may include, for example, translating the KVP-oriented commands to one or more block-oriented commands that may be used, for example, to access at least one of a key or a value associated with the KVP that may be stored in a storage area contained in storage device 300. As will be described further below, the key associated with the KVP may be a hash value and the value associated with the KVP may be an item. The block-oriented commands may be transferred by the hash map logic 308 to the command processing logic 310 which may perform the block-oriented commands to access the key and/or value. Hash map logic 308 may include some combination of one or more processors, microprocessors, FPGAs, ASIPs, ASICs, CPLDs, and/or other types of processing logic that may be used to process the KVP-oriented commands.

The command processing logic 310 may include logic for processing (e.g., executing) block-oriented commands associated with storage device 300. Processing may include getting, setting, and/or deleting information (e.g., hash values, items) contained in logical blocks in storage area 312. The block-oriented commands may include block-oriented commands that may be issued, for example, by device driver 208 (FIG. 2) and/or hash map logic 308. Command processing logic 310 may include some combination of one or more processors, microprocessors, FPGAs, ASIPs, ASICs, CPLDs, and/or other types of processing logic that may be used to process the block-oriented commands.

Storage area 312 may include a volatile and/or non-volatile storage for storing information. The information may be stored in logical blocks that may be contained in one or more memory devices and/or media. Memory devices contained in storage area 312 may include, for example, non-volatile random access memory devices. The memory devices may provide, for example, low-latency random access to information stored by the memory devices. Examples of memory devices that may be contained in storage area 312 may include memory devices such as described above. Examples of media that may be contained in storage area 312 include magnetic discs and/or optical discs.

Figure 4:
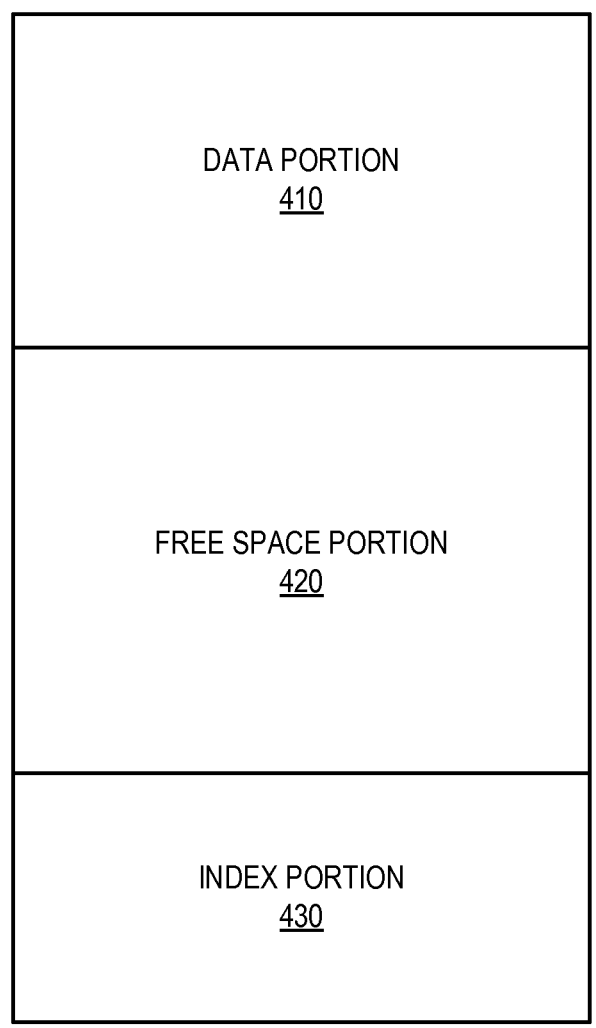
FIG. 4 illustrates an example embodiment of a storage layout for a storage device.

FIG. 4 illustrates an example embodiment of a storage layout 400 for storage area 312. Referring to FIG. 4, storage layout 400 may include a data portion 410, a free space portion 420, and an index portion 430.

The data portion 410 may be used to store an item. The item may include data that may be associated with a hash value. The item in combination with the hash value may comprise a KVP, where the item may be the value of the KVP and the hash value may be the key of the KVP. As will be described further below, an item which may be part of a KVP may be stored in the data portion 410.

The free space portion 420 may include storage that may be used to expand the data portion 410 and/or index portion 430. Storage in the free space portion 420 may be allocated to the data portion 410 and/or the index portion 430 to expand these portions 410, 430. In addition, storage that is no longer in use in the data portion 410 and/or the index portion 430 may be reallocated from these portions 410, 430 to the free space portion 420.

For example, suppose the data portion 410 needs to be expanded. Storage from the free space portion 420 may be reallocated from the free space portion 420 to the data portion 410. Now suppose an item is deleted from the data portion 410. Storage in the data portion 410 associated with the deleted item may be reallocated to the free space portion 420.

Figure 5:
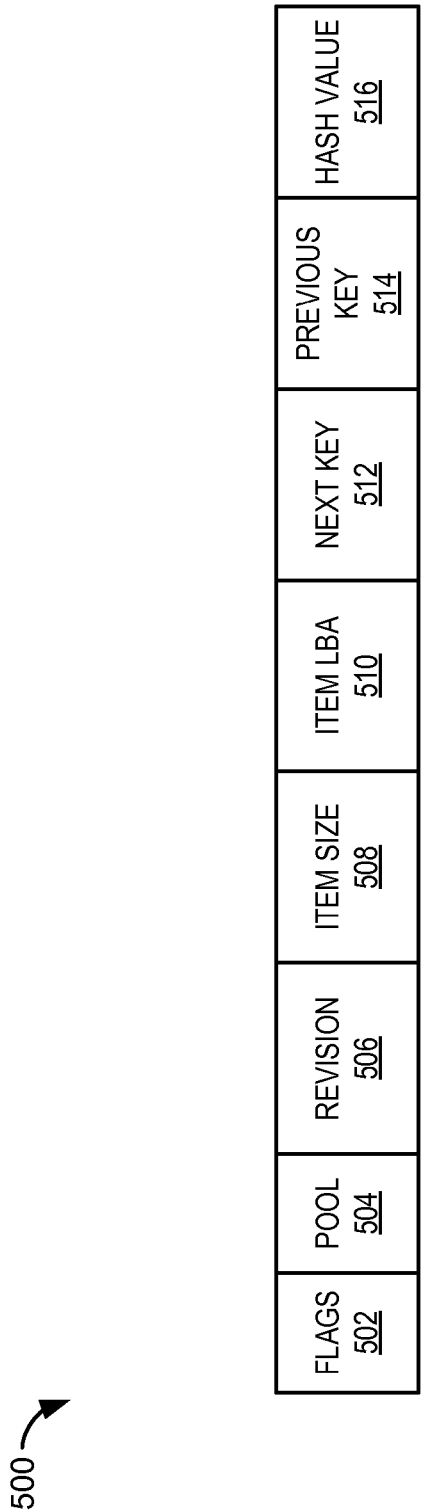
FIG. 5 illustrates an example embodiment of an index entry that may be contained in an index portion of a storage layout for a storage device.

Index portion 430 may contain one or more index entries where an index entry may be used, inter alia, to associate an item with a hash value. FIG. 5 illustrates an example embodiment of an index entry 500 that may be contained in index portion 430. Referring to FIG. 5, index entry 500 may include a flags field 502, a pool field 504, a revision field 506, an item size field 508, an item logical block address (LBA) field 510, a next key field 512, a previous key field 514, and a hash value field 516.

The flags field 502 may hold one or more flags that may be associated with the index entry 500. These flags may include, for example, a configuration flag, a local flag, and a valid flag.

The configuration flag may indicate a configuration of a logical block in the index portion 430 that holds the index entry 500. Example configurations that may be used to hold an index entry 500 will be described further below. The local flag may indicate that an item associated with the hash value contained in the hash value field 516 is stored in the index portion 430. Details of the local flag will be discussed further below. The valid flag may be used to indicate whether the index entry 500 is valid.

The pool field 504 may be used to group index entries 500 together to form a pool of index entries 500. Pooling may be used to relate index entries 500. An index entry 500 in a pool may be considered a member of that pool.

For example, suppose a first index entry 500 holds a value in its pool field 504 that indicates the first index entry 500 is a member of a particular pool. Further, suppose a second index entry 500 contains the same value in its pool field 504 thereby indicating it too is a member of the pool. The first index entry 500 and the second index entry 500 may be related in that they may be considered members of the same pool.

The revision field 506 may hold a value that may indicate a revision of an item associated with the index entry 500. For example, for an initial version of the item, the revision field 506 may hold a value of zero. After the item has been updated (e.g., rewritten), the value held by the revision field 506 may be changed (e.g., incremented to one) to reflect the version of the updated item.

The item size field 508 may hold a value that may identify a size (e.g., in logical blocks) of an item that may be associated with the index entry 500. For example, if the item is stored in a single logical block in the data portion 410, the item LBA field 510 may hold an LBA of the logical block. Also, for example, if the item occupies multiple logical blocks in the data portion 410, the LBA field 510 may hold, for example, an address of an indirection block. The indirection block may be a logical block in the data portion 410 that contains one or more LBAs of logical blocks that contain the item.

The following examples may be helpful in understanding the item size field 508 and the LBA field 510. Suppose, for example, an item occupies a single logical block in the data portion 410. The item size field 508 may contain a value of one to indicate that the item occupies a single logical block. The LBA field 510 may contain an LBA of the logical block that contains the item. Now suppose, for example, an item occupies two logical blocks in the data portion 410. The item size field 508 may contain a value of two to indicate that the item occupies two logical blocks. The LBA field 510 may contain an LBA of an indirection block that may contain the LBAs of the two logical blocks that the item occupies.

The next key field 512 and the previous key field 514 may be used to link members in a pool. The next key field 512 may hold a value that may identify a next member in a pool relative to the index entry 500. The previous key field 514 may hold a value that may identify a previous member in the pool relative to the index entry 500.

For example, suppose that each index entry 500 in a pool is associated with a unique hash value. Further, suppose that members of the pool are linked using a linked list defined by the next key field 512 and the previous key field 514. The next key field 512 may hold a hash value associated with a member in the pool that is the next member in the linked list relative to the member represented by the index entry 500. The previous key field 514 may hold a hash value associated with a member in the pool that is the previous member in the linked list relative to the member represented by the index entry 500.

The hash value field 516 may hold a hash value associated with an item that is associated with the index entry 500. As noted the above, a hash value and an item may form a KVP. Here, the hash value contained in the hash value field 516 may be considered the key portion of the KVP and the item associated with the index entry 500 may be considered the value portion of the KVP.

Figure 6:
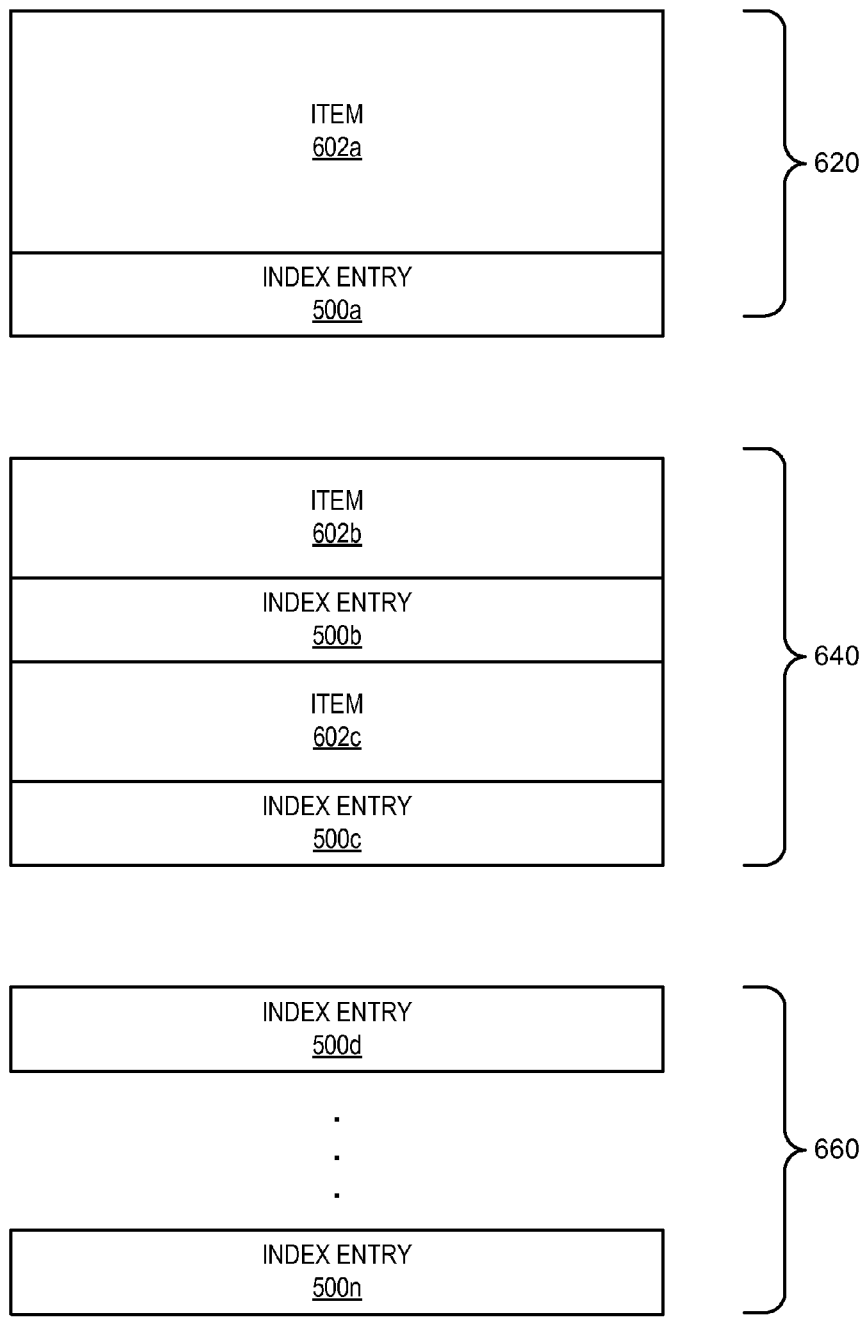
FIG. 6 illustrates example embodiments of configurations that may hold one or more index entries.

FIG. 6 illustrates example embodiments of configurations 620, 640, 660 that may hold one or more index entries 500. A configuration 620, 640, 660 may be contained in, for example, a single logical block in the index portion 430 of layout 400.

Referring to FIG. 6, configuration 620 may include a single index entry 500a and an item 602a associated with the index entry 500a. Configuration 620 may be used, for example, in situations when the index entry 500a and its associated item 602a may fit within a single logical block in the index portion 430.

Configuration 640 includes two index entries 500b and 500c and two items 602b and 602c. Items 602b and 602c are associated with the index entries 500b and 500c, respectively. Configuration 640 may be used, for example, in situations where items 602b and 602c and index entries 500b and 500c may be small enough such that they may fit in a single logical block in the index portion 430.

Configuration 660 may include a plurality of index entries 500d-n. The plurality of index entries 500d-n may be contained in a single logical block in the index portion 430. Items associated with the index entries 500d-n may be stored in the data portion 410. Configuration 660 may be used, for example, in situations where items may be too large to fit along with their associated index entries 500 in a single logical block.

Note that the configurations 620, 640, 660 are examples of configurations that may be used in the index portion 430. It should be noted that other configurations that may hold index entries 500 and/or items may be used in the index portion 430. For example, a configuration containing four index entries 500 and four items associated with the index entries 500 may be used.

A configuration 620, 640, 660 may be associated with an identifier. The identifier may, for example, be unique and may be used to identify a format of the configuration. For example, configuration 620 may be associated with an identifier that may be used to distinguish the configuration 620 from configurations 640 and 660. Index entry 500a may a configuration flag contained in the flags field 502 of the index entry 500a may be set to a value that may indicate that index entry 500a is contained in a logical block that follows the format of configuration 620.

Figure 7:
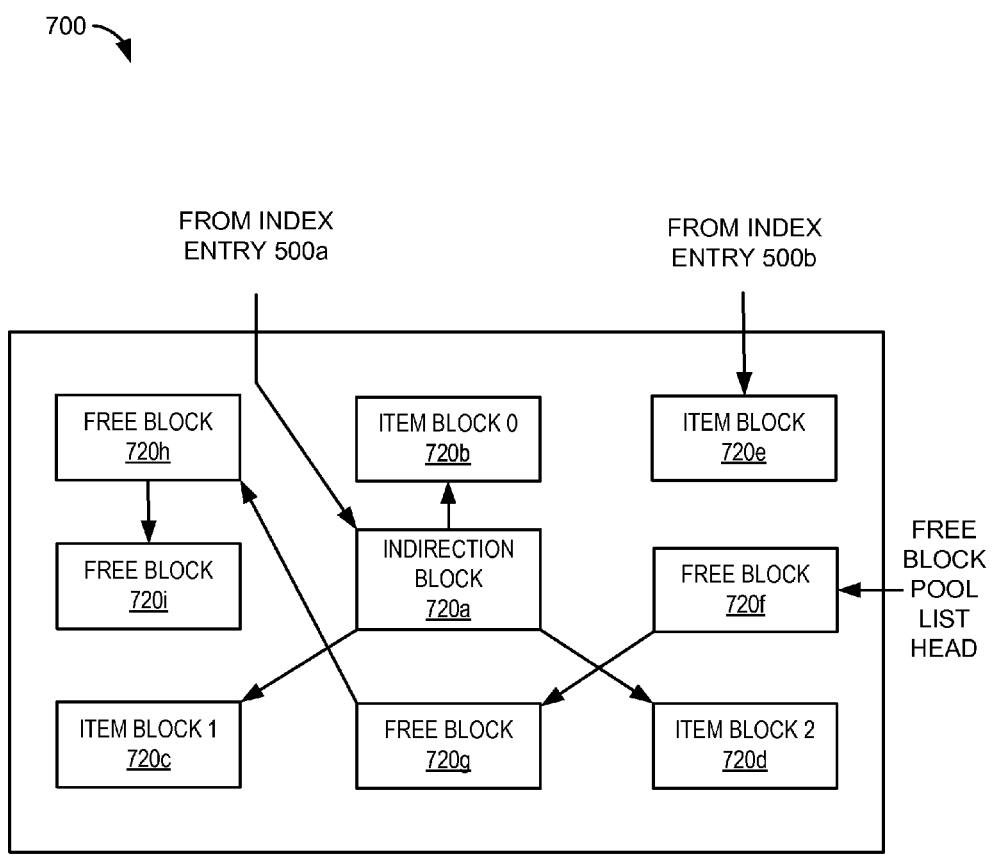
FIG. 7 illustrates an example layout of the data portion of a storage layout for a storage device.

As noted above, storage area 312 may include a data portion 410 where items associated with index entries 500 may be stored. FIG. 7 illustrates an example layout 700 of data portion 410 that may be used to store, for example, items associated with two index entries 500a and 500b.

Referring to FIG. 7, index entry 500a may be associated with an item that may occupy logical blocks 720b-d. Index entry 500b may be associated with an item that may occupy a single logical block 720e.

An LBA field 510 in index entry 500a may contain an LBA associated with indirection block 720a. In addition, the item size field 508 in index entry 500a may be set to the value five. The indirection block 720a my include LBAs of logical blocks 720b-d that the item for index entry 500a occupies. The LBAs for the logical blocks 720b-d may be included in a data structure (e.g., list, table) that may be contained in indirection block 720a. The data structure may be maintained (e.g., created, updated) by hash map logic 308 (FIG. 3).

Regarding index entry 500b, the item associated with index entry 500b may be contained entirely within logical block 720e. An LBA field 510 contained in index entry 500b may contain an LBA associated with logical block 720e. In addition, the item size field 508 in the index entry 500b may be set to the value one.

Logical blocks in the data portion 410 that do not contain an item may be considered free blocks. As shown in FIG. 7, a free block pool may be maintained in the data portion 410. Logical blocks contained in the free block pool may be linked together to form a list (e.g., singly linked list, doubly linked list). The list may be referred to as a free block pool list.

If a logical block is needed to store an item associated with an index entry 500, hash map logic 308 may allocate the logical block from the free block pool. Allocating may include updating the free block pool list to remove the allocated logical block from the free block pool list. Hash map logic 308 may update the LBA field 510 of the index entry 500 with the LBA of the allocated logical block.

If a logical block is no longer needed to store an item, hash map logic 308 may add the logical block to the free block pool. Adding the logical block to the free block pool may include, for example, updating the free block pool list.

The first entry in the free block pool list may be pointed to by a pointer. The pointer may be maintained by the hash map logic 308. The pointer may be updated as logical blocks are removed from and/or added to the free block pool list.

Referring now to FIGS. 1-7, host software 200 may generate various commands to access information stored in storage device 300. These commands may include, for example, block-oriented commands and/or KVP-oriented commands. The commands may be transferred to storage device 300 via I/O bus 110.

Device processing logic 302 may acquire the commands and transfer KVP-oriented commands to hash map logic 308 for further processing. Processing performed by hash map logic 308 may include, for example, generating one or more block-oriented commands based on the KVP-oriented commands. The generated block-oriented command may be transferred to command processing logic 310 for further processing.

Other processing that may be performed by hash map logic 308 may include, for example, maintaining index entries 500 in the index portion 430, storing/retrieving items stored in the data portion 410, managing the size of the data portion 410 and/or index portion 430, and/or managing information (e.g., linked lists) associated with logical blocks contained in the data portion 410.

Figure 8A:
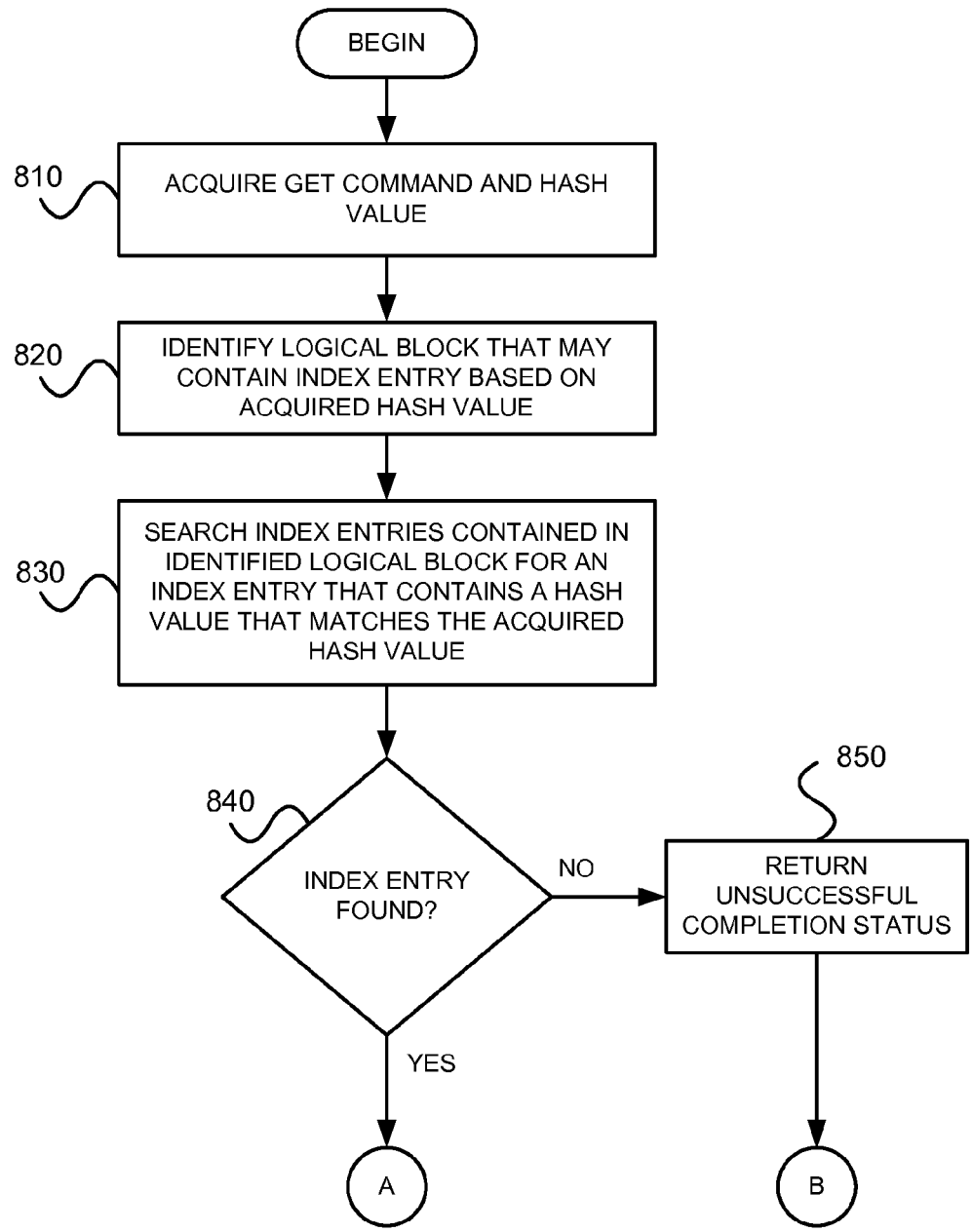
FIGS. 8A-B illustrate a flow diagram of example acts that may be performed to process a get command associated with a storage device.
Figure 8B:
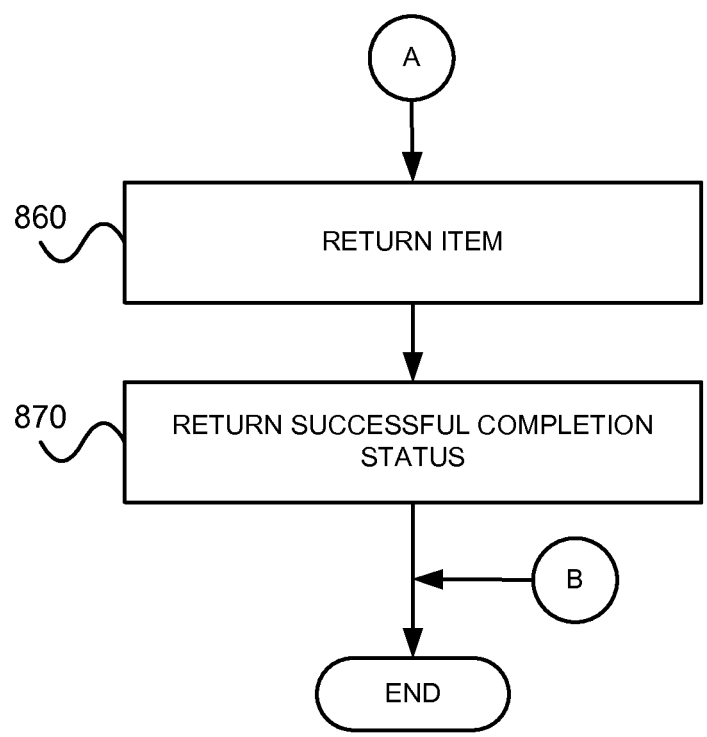

Commands generated by host software 200 may include get commands. A get command may be used to retrieve information from storage device 300. A KVP-oriented get command may be used to retrieve an item stored in storage device 300 where the item may be associated with a hash value. FIGS. 8A-B illustrate a flow chart of example acts that may be performed by storage device 300 to process a KVP-oriented get command.

Referring now to FIG. 8A, at block 810, the get command and a hash value may be acquired. The get command and hash value may be generated by host software 200. The command and hash value may be transferred via I/O bus 110 from host software 200 to the storage device 300. The get command may be used by host software 200 to direct the storage device 300 to retrieve an item associated with the hash value.

At block 820, a logical block that may contain an index entry 500 associated with the hash value may be identified based on the acquired hash value. The logical block may be contained in index portion 430. The logical block may be identified based on the values of certain bits in the acquired hash value. For example, the logical block may be identified based on the value of various most significant bits (MSBs) contained in the hash value. It should be noted, however, that other techniques may be used to identify the logical block based on the hash value.

At block 830, index entries 500 contained in the identified logical block may be searched to determine whether the identified logical block contains an index entry 500 that has a hash value that matches the acquired hash value. For example, suppose each index entry 500 contains a hash value in hash value field 516 of the index entry 500. Hash map logic 308 may generate one or more block-oriented commands to retrieve the index entries 500 from the identified logical block. Hash map logic 308 may transfer the generated block-oriented commands to the command processing logic 310 to perform the block-oriented commands. Performing the block-oriented commands may cause the command processing logic 310 to retrieve (e.g., read) the index entries 500 from the identified logical block and transfer the index entries 500 to the hash map logic 308. The hash map logic 308 may compare values contained in the index entries 500 with the acquired hash value to search for an index entry 500 that contains a hash value that matches the acquired hash value.

At block 840, a check may be performed to determine whether an index entry 500 that contains a hash value that matches the acquired hash value was found. If at block 840 it is determined that an index entry 500 that contains a hash value that matches the acquired hash value was not found, at block 850, an unsuccessful completion status is returned. The unsuccessful completion status may be returned to host software 200 via I/O bus 110.

If at block 840 it is determined that an index entry 500 that contains a hash value that matches the acquired hash value was found, at block 860 (FIG. 8B) an item associated with the index entry 500 is returned to host software 200. The item may be, for example, fetched from the data portion 410 or index portion 430. Fetching the item may include, for example, the hash map logic 308 generating one or more block-oriented commands to fetch (e.g., read) the item from the data portion 410 or the index portion 430. The hash map logic 308 may transfer the generated block-oriented commands to the command processing logic 310 which may perform the generated block-oriented commands to fetch the item. After fetching the item, the may be returned by device processing logic 302 to host software 200 via I/O bus 110.

At block 870, a successful completion status may be generated and returned to host software 200. The successful completion status may be generated by device processing logic 302 and returned to host software 200 via I/O bus 110.

Commands generated by host software 200 may include set commands. A set command may be used to store information in storage device 300. A KVP-oriented set command may be used to store an item stored in storage device 300 where the item may be associated with a hash value. Here, the item may be a value of a KVP and the hash value may be a key of the KVP.

Figure 9A:
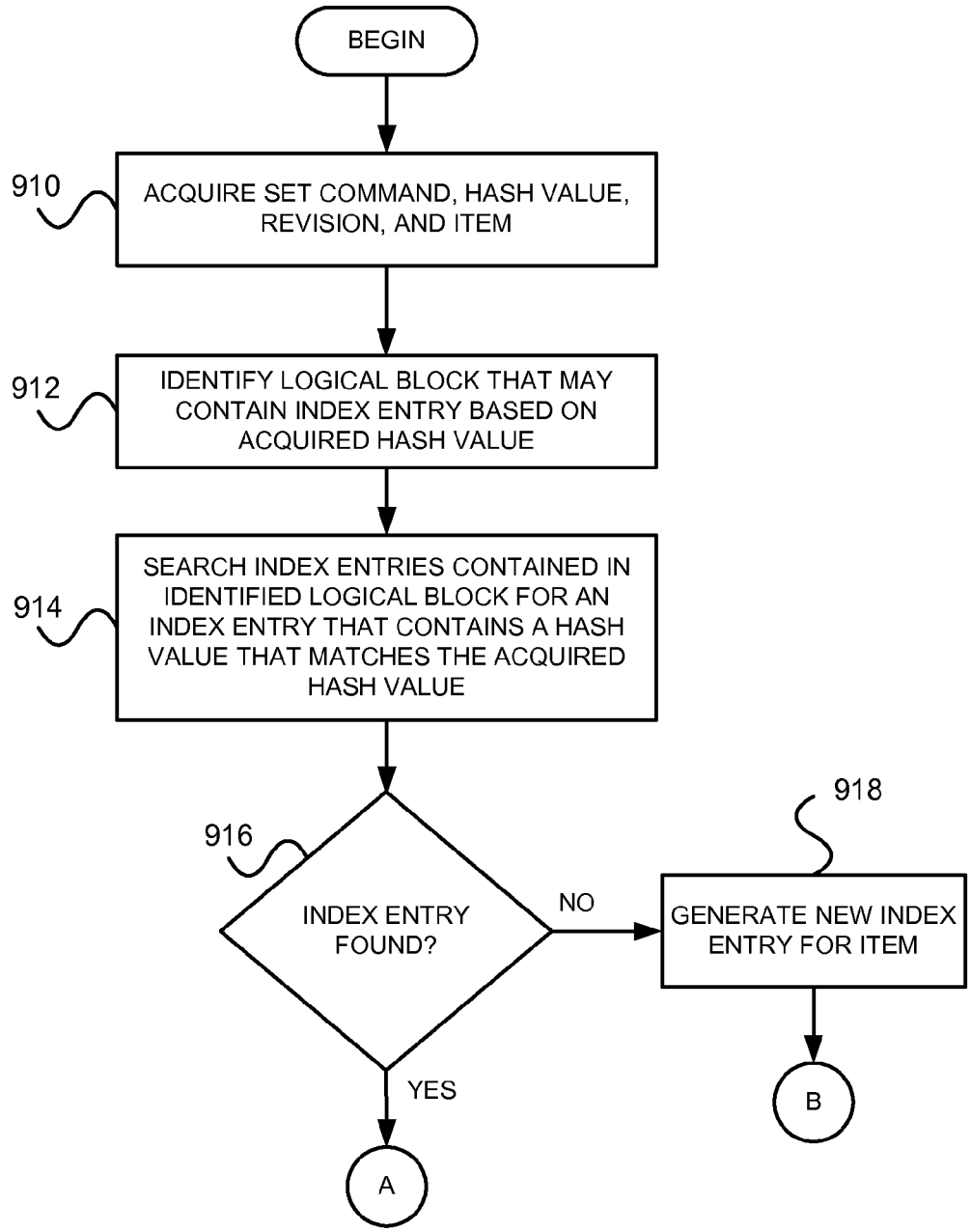
FIGS. 9A-C illustrate a flow diagram of example acts that may be performed to process a set command associated with a storage device.
Figure 9B:
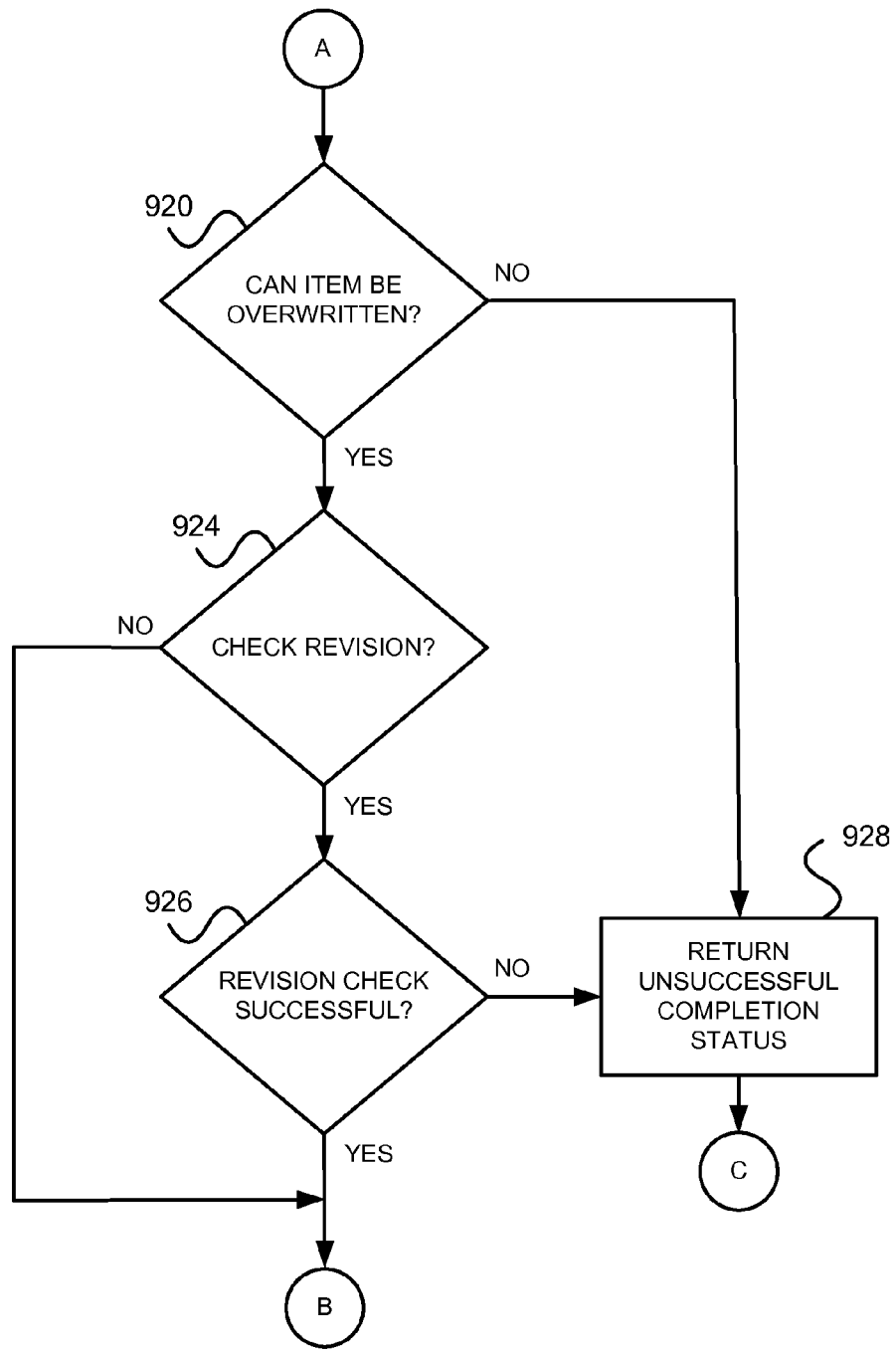
Figure 9C:
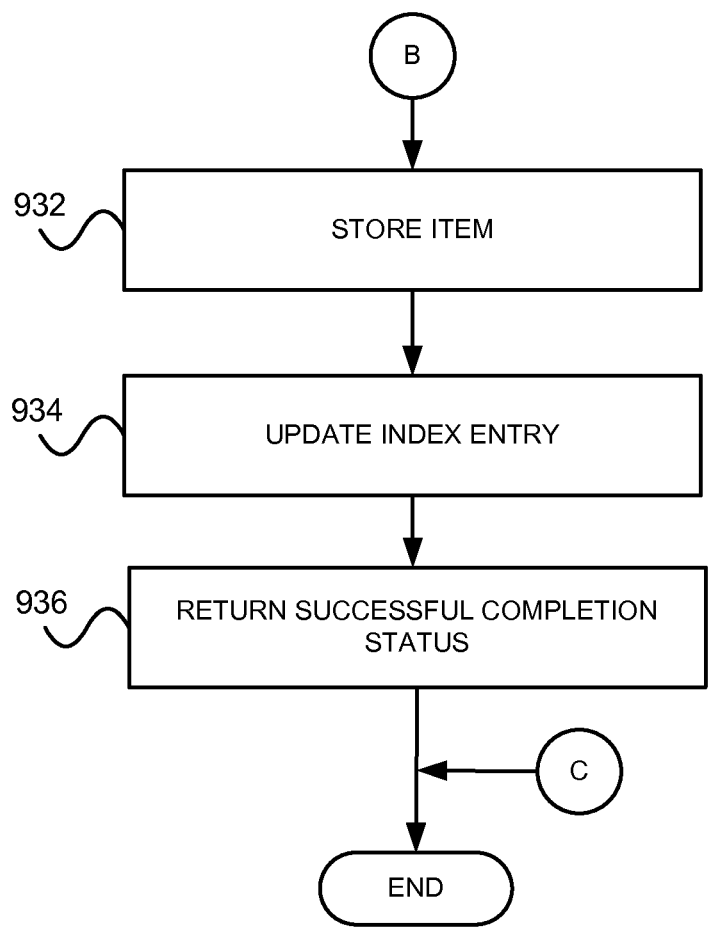

FIGS. 9A-C illustrate a flow chart of example acts that may be performed by storage device 300 to process a KVP-oriented set command. Referring to FIG. 9A, at block 910, the set command, revision value, and a KVP that includes an item and hash value may be acquired. The hash value may be part of a key in the KVP and the item may be a value in the KVP. The revision value may indicate a revision of the item.

The set command, hash value, revision value, and/or item may be generated by host software 200. The set command may be used to direct storage device 300 to associate the item with the hash value and store the item in the storage device 300. The storage device 300 may associate the item with the hash value using an index entry 500 that may be contained in index portion 430.

At block 912, a logical block that may contain an index entry 500 associated with the hash value may be identified based on the acquired hash value such as described above. At block 914, index entries 500 contained in the identified logical block may be searched to determine whether the identified logical block contains an index entry 500 that has a hash value that matches the acquired hash value such as described above. At block 916, a check may be performed to determine whether an index entry 500 that contains a hash value that matches the acquired hash value was found.

If an index entry was found, at block 920 (FIG. 9B), a check may be performed to determine whether an item associated with the found index entry 500 may be overwritten. Here, For example, the check may include examining a flag in the flags field 502 of the index entry 500 to determine whether the flag indicates the item may be overwritten.

If at block 920, the item may not be overwritten, at block 928 an unsuccessful completion status may be returned. The unsuccessful completion status may be generated and returned to host software 200 such as described above.

If at block 920, the item may be overwritten, at block 924, a check may be performed to determine whether the acquired revision value and a revision value associated with the item to be over written should be checked. This check may involve, for example, examining a flag in the flags field 502 of the index entry 500 to determine whether the flag indicates the acquired revision and the revision value associated with the item to be overwritten should be checked.

If at block 924 it is determined that the revision should be checked, at block 926 the revision may be checked and a check may be performed to determine whether the revision check was successful. Here, for example, the revision associated with the item to be overwritten may be contained in the revision field 506 of the index entry 500. The revision in the revision field 506 may be compared with the acquired revision to determine, for example, whether the acquired revision meets certain criteria with respect the revision of the item to be overwritten. The criteria may include, for example, the acquired revision being a later revision than the revision of the item to be overwritten. If the acquired revision meets the criteria, the revision check may be deemed successful. If the acquired revision does not meet the criteria, the revision check may be deemed unsuccessful. If at block 926 the revision check is deemed unsuccessful, at block 928 an unsuccessful completion status may be returned such as described above.

If at block 926, the revision check is deemed successful, at block 932 (FIG. 9C), the item is stored in the storage device 300. Storing the item may include the hash map logic 308 generating one or more block-oriented commands based on the acquired item and hash value that when performed may store the item in the data portion 410 or index portion 430. The block-oriented commands may be transferred from the hash map logic 308 to the command processing logic 310 which may perform the block-oriented commands to store the item. In addition, the hash map logic 308 may generate one or more block-oriented commands that when performed may maintain (e.g., update, create) lists in the data portion 410 as necessary to accommodate storing the item in storage device 300. The generated block-oriented commands may be transferred from the hash map logic 308 to the command processing logic 310 which may perform (e.g., execute) the block-oriented commands to maintain the lists.

At block 934, the index entry 500 may be updated. Updating the index entry 500 may include, for example, updating various fields contained in the index entry 500 to accommodate the item and/or associate the item with the index entry 500. Hash map logic 308 may generate one or more block-oriented commands that when performed may store the updated index entry 500 in the index portion 430. Hash map logic 308 may transfer the generated block-oriented commands to command processing logic 310 which may perform the block-oriented commands.

At block 936, a successful completion status is returned. The successful completion status may be returned to host software 200 such as described above.

Returning back to FIG. 9A, if at block 916 an index entry 500 was not found, at block 918 a new index entry 500 for the acquired item may be generated (e.g., created). The new index entry 500 may be generated in the index portion 430. Generating the new index entry 500 may include the hash map logic 308 generating one or more block-oriented commands that when performed may allocate a logical block in the index portion 430 for the new index entry 500. The block-oriented commands may be transferred to the command processing logic 310 which may perform the block-oriented commands.

After the new index entry 500 is generated, at block 932 (FIG. 9C) the acquired item may be stored. Here, storing may include storing the item in the index portion 430 such as, for example, described above, or storing the item in the data portion 410. Storing the item in the data portion 410 may include, for example, allocating one or more logical blocks from the free space portion 420 to hold the item and storing the item in the allocated blocks. Allocation of the logical blocks and storing the item in the allocated blocks may involve the hash map logic 308 generating one or more block-oriented commands and transferring the commands to command processing logic 310 as described above.

At block 934, the new index entry 500 may be updated. The updating may include, inter alia, associating the new index entry 500 with the item. For example, updating the new index entry 500 may include the hash map logic 308 setting the acquired hash value in the hash value field 516 of the new index entry 500. In addition, the size of the item (e.g., in logical blocks) and an LBA associated with a logical block containing the item may be set by the hash map logic 308 in the item size field 508 and the item LBA field 510 of the new index entry 500. Moreover, if the item is stored in the index portion 430, a flag (e.g., local flag) in the hash map logic 308 may update the new index entry 500 to indicate that the item is stored in the index portion 430. In addition, a configuration of the logical block that contains the index entry 500 may be indicated in the new index entry 500. For example, if the configuration of the logical block follows the format in configuration 620, the hash map logic 308 may set a value in the flags field 502 to indicate that the logical block follows the format in configuration 620.

Updating may also include storing the new hash map value in the logical block. For example, the hash map logic 308 may generate one or more block-oriented commands that when performed may store the new hash map value in the logical block contained in the index portion 430. The generated block oriented commands may be transferred to the command processing logic 310 which may perform the block-oriented commands.

Commands generated by host software 200 may include delete commands. A delete command may be used to delete information that is stored in storage device 300. A KVP-oriented delete command may be used to delete an item stored in storage device 300 where the item may be associated with a hash value. Here, the item may be a value of a KVP and the hash value may be a key of the KVP.

Figure 10:
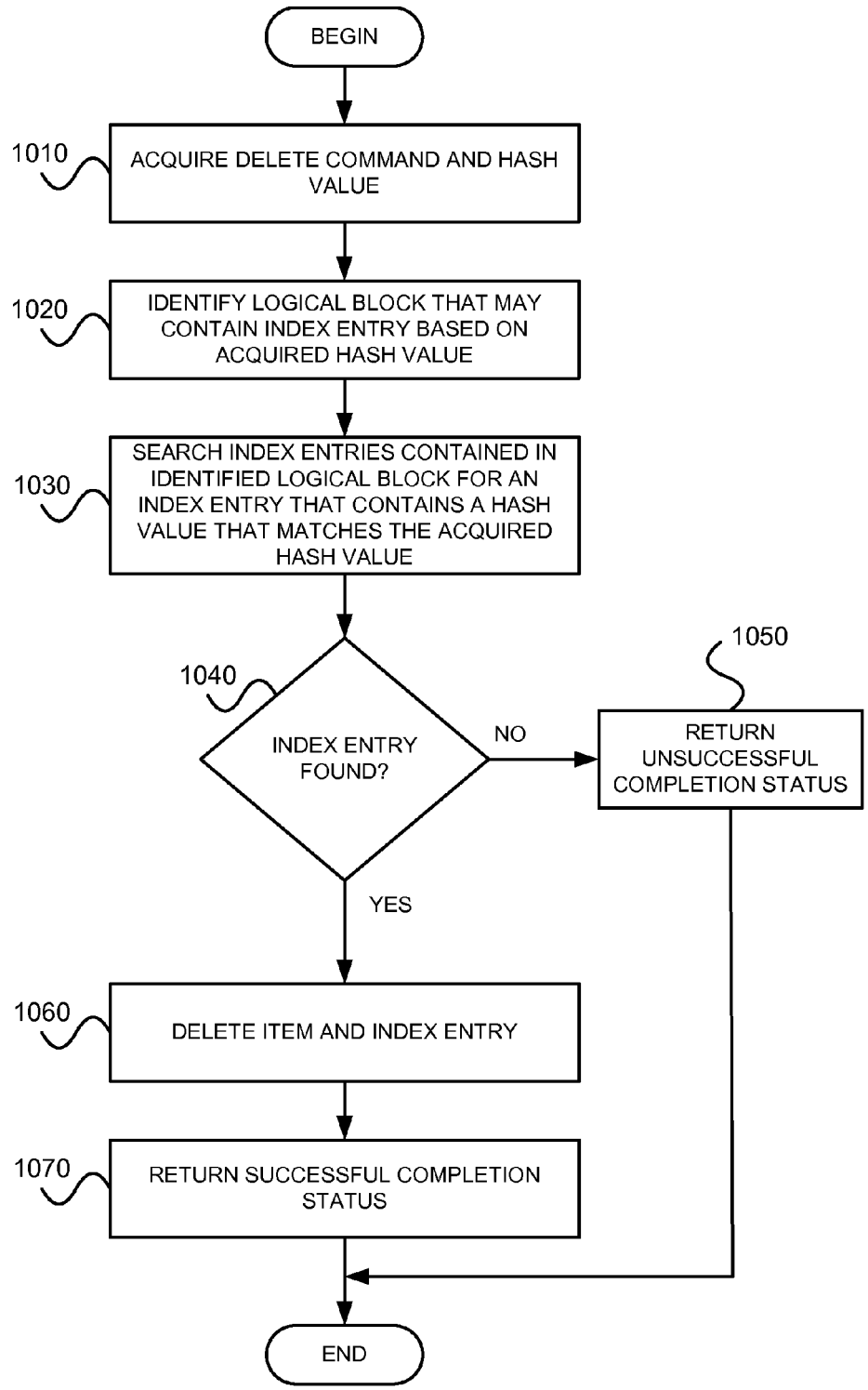
FIG. 10 illustrates a flow diagram of example acts that may be performed to process a delete command associated with a storage device.

FIG. 10 illustrates a flow chart of example acts that may be performed by storage device 300 to process a KVP-oriented delete command. Referring now to FIG. 10, at block 1010, the delete command and a hash value may be acquired. The hash value may be used to identify the item that is to be deleted.

The delete command and hash value may be generated by an entity such as, for example host software 200. The delete command and hash value may be acquired by storage device 300 via I/O bus 110 such as described above. The delete command may direct the storage device 300 to delete an item associated with the hash value from the storage device 300.

At block 1020, a logical block that may contain an index entry 500 associated with the hash value may be identified based on the acquired hash value such as described above. At block 1030, index entries 500 contained in the identified logical block may be searched to determine whether the identified logical block contains an index entry 500 that has a hash value that matches the acquired hash value such as described above.

At block 1040, a check may be performed to determine whether an index entry 500 that contains a hash value that matches the acquired hash value was found. If not, at block 1050, an unsuccessful completion status may be returned. The unsuccessful completion status may be returned to host software 200 via I/O bus 110 such as described above.

If at block 1040 an index entry 500 that contains a hash value that matches the acquired hash value is found, at block 1060 the item associated with the index entry may be deleted. In addition, at block 1060 the index entry may be deleted. Deleting the item may include, for example, returning one or more logical blocks allocated for the deleted item to a free space portion (e.g., free space portion 420) contained in the storage device. Deleting the index entry may include, for example, marking the index entry as invalid. Functions performed to delete the item and/or the index entry may involve, for example, the hash map logic 308 generating one or more block-oriented commands that when performed may perform these functions and transferring the block-oriented commands to command processing logic 310 which may perform the block-oriented commands.

At block 1070 a successful completion status may be returned to the host software 300 via I/O bus 110 as described above.

It should be noted that storage device 300 may implement a caching scheme for items that may belong to a pool. The caching scheme may be based on an algorithm such as, for example, a least recently used (LRU) algorithm.

For example, suppose a plurality of index entries 500 belong to a pool that may be identified by the pool field 504 contained in the index entries 500. A linked list for the pool may be formed using the next key field 512 and previous key field 514 in the index entries 500. Now suppose an item associated with an index entry 500 is accessed using a get or set command. The linked list for the pool may be modified in the index entries 500 to place the index entry 500 at the head of the list thus indicating, for example, the index entry 500 is the most recently used index entry 500 in the pool. Further, the linked list for the pool may be modified to remove the last index entry 500 in the linked list as this index entry 500 may be considered the least recently used index entry 500 in the pool.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 8A-B, 9A-C and 10, the order of the acts may be modified in other implementations. Further, non-dependent acts may be performed in parallel.

Also, the term "user", as used herein, is intended to be broadly interpreted to include, for example, a computing device (e.g., fixed computing device, mobile computing device) or a user of a computing device, unless otherwise stated.

It will be apparent that one or more embodiments, described herein, may be implemented in many different forms of software and/or hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, techniques described herein may be implemented using computer-executable instructions that may be executed by processing logic such as, for example, processing logic 120 and/or device processing logic 302. The computer-executable instructions may be stored on one or more non-transitory tangible computer-readable storage media. The media may be volatile or non-volatile and may include, for example, DRAM storage, SRAM storage, and/or flash memory storage.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A storage device comprising:
a storage area containing one or more non-volatile random access memory devices for storing at least one of a hash value or an item, the storage area having a data portion and an index portion, the data portion including storage for storing items and the index portion including storage for storing items and index entries, the index entries stored in the index portion being associated with hash values that are associated with items stored in the data portion or the index portion; and
device processing logic for:
acquiring a command associated with a key-value pair (KVP), the KVP including a hash value and an item, the hash value being a key of the KVP and the item being a value of the KVP,
acquiring the hash value,
determining that an index entry associated with the acquired hash value exists in the index portion of the storage area in the storage device,
performing one or more block-oriented commands to retrieve the index entry from the index portion,
identifying a logical block in the data portion of the storage area, the logical block containing the item, the logical block being identified based on a logical block address (LBA) contained in the retrieved index entry, and
performing one or more block-oriented commands to retrieve the item from the identified logical block in the data portion.

2. The storage device of claim 1, wherein the device processing logic further:
identifies a logical block in the index portion that contains the index entry, and
performs one or more block-oriented commands to retrieve the index entry from the identified logical block in the index portion.

3. A method comprising:
acquiring, at a storage device, a command associated with a key-value pair (KVP), the KVP including a hash value and an item, the hash value being a key of the KVP and the item being a value of the KVP;
acquiring, at the storage device, the hash value;
determining, at the storage device, that an index entry associated with the acquired hash value exists in an index portion contained in a storage area in the storage device, the storage area containing one or more non-volatile random access memory devices for storing the at least one of the hash value or the item, the storage area having a data portion and the index portion, the data portion including storage for storing items and the index portion including storage for storing items and index entries, the index entries stored in the index portion being associated with hash values that are associated with items stored in the data portion or the index portion;
performing, at the storage device, one or more block-oriented commands to retrieve the index entry from the index portion;
identifying, at the storage device, a logical block in the data portion of the storage area, the logical block containing the item, the logical block being identified based on a logical block address (LBA) contained in the retrieved index entry; and
performing, at the storage device, one or more block-oriented commands to retrieve the item from the identified logical block in the data portion.

4. The method of claim 3, further comprising:
identifying, at the storage device, a logical block in the index portion that contains the index entry; and
performing, at the storage device, one or more of the block-oriented commands to retrieve the index entry from the identified logical block in the index portion.

5. A storage device comprising:
a storage area containing one or more non-volatile random access memory devices for storing at least one of a hash value or an item, the storage area having a data portion and an index portion, the data portion including storage for storing items and the index portion including storage for storing items and index entries, the index entries stored in the index portion being associated with hash values that are associated with items stored in the data portion or the index portion; and
device processing logic for:
acquiring a command associated with a key-value pair (KVP), the KVP including a hash value and an item, the hash value being a key of the KVP and the item being a value of the KVP,
acquiring the hash value and the item,
determining that an index entry associated with the acquired hash value exists in the index portion of a storage area in the storage device,
performing one or more block-oriented commands to retrieve the index entry from the index portion, identifying a logical block in the data portion of the storage area, the logical block containing the item, the logical block being identified based on a logical block address (LBA) contained in the retrieved index entry, and performing one or more block-oriented commands to store the item in the identified logical block in the data portion.

6. The storage device of claim 5, wherein the device processing logic further:

determines based on a flag contained in the index entry that the item is to be stored in the index portion, and performs one or more block-oriented commands to store the item in the index portion.

7. The storage device of claim 5, wherein the device processing logic further:

sets an item size field contained in the index entry to a value that represents a length of the item.

8. The storage device of claim 7, wherein the value that represents the length of the item represents a number of logical blocks in the data storage area that the item occupies.

9. A method comprising:

acquiring, at a storage device, a command associated with a key-value pair (KVP), the KVP including a hash value and an item, the hash value being a key of the KVP and the item being a value of the KVP;

acquiring, at the storage device, the hash value and the item;

determining, at the storage device, that an index entry associated with the acquired hash value exists in an index portion contained in a storage area in the storage device, the storage area containing one or more non-volatile random access memory devices for storing the at least one of the hash value or the item, the storage area having a data portion and the index portion, the data portion including storage for storing items and the index portion including storage for storing items and index entries, the index entries stored in the index portion being associated with hash values that are associated with items stored in the data portion or the index portion;

performing, at the storage device, one or more block-oriented commands to retrieve the index entry from the index portion;

identifying, at the storage device, a logical block in the data portion of the storage area, the logical block containing the item, the logical block being identified based on a logical block address (LBA) contained in the retrieved index entry; and performing, at the storage device, one or more block-oriented commands to store the item in the identified logical block in the data portion.

10. The method of claim 9, further comprising:

determining, at the storage device, based on a flag contained in the index entry that the item is to be stored in the index portion; and performing, at the storage device, one or more block-oriented commands to store the item in the index portion.

11. The method of claim 9, further comprising:

setting an item size field contained in the index entry to a value that represents a length of the item.

12. The method of claim 11, wherein the item is stored in the data storage area of the storage device and wherein the value that represents the length of the item represents a number of logical blocks in the data storage area that the item occupies.

13. A storage device comprising:

a storage area containing one or more non-volatile random access memory devices for storing at least one of a hash value or an item, the storage area having a data portion and an index portion, the data portion including storage for storing items and the index portion including storage for storing items and index entries, the index entries stored in the index portion being associated with hash values that are associated with items stored in the data portion or the index portion; and device processing logic for:

acquiring a command associated with a key-value pair (KVP), the KVP including a hash value and an item, the hash value being a key of the KVP and the item being a value of the KVP, acquiring the hash value and the item, determining that an index entry associated with the acquired hash value does not exist in the index portion of a storage area in the storage device, generating an index entry for the acquired hash value, associating the hash value with the generated index entry, performing one or more block-oriented commands to store the generated index entry in the index portion of the storage area, allocating a logical block contained in the data portion of the storage area, and performing one or more block-oriented command to store the item in the allocated logical block.

14. The storage device of claim 13, wherein the logical block is associated with an LBA that identifies a location of the logical block in the storage area, and wherein associating the hash value with the index entry includes:

the device processing logic setting an item LBA field contained in the index entry to a value that represents the LBA, and the device processing logic setting the hash value in a hash value field contained in the index entry.

* * * * *